(12) United States Patent
Toda et al.

(10) Patent No.: US 6,817,741 B2
(45) Date of Patent: Nov. 16, 2004

(54) IRRADIATING DIRECTION CONTROL DEVICE FOR VEHICLE LAMP

(75) Inventors: Atsushi Toda, Shizuoka (JP); Makoto Izawa, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/207,834

(22) Filed: Jul. 31, 2002

(65) Prior Publication Data

US 2003/0026107 A1 Feb. 6, 2003

(30) Foreign Application Priority Data

Aug. 1, 2001 (JP) ......................................... 2001-233419

(51) Int. Cl.$^7$ ................................................ B60Q 1/08
(52) U.S. Cl. ..................................... 362/466; 362/276
(58) Field of Search ................................. 362/466, 464, 362/460, 465, 276, 37, 271, 275

(56) References Cited

U.S. PATENT DOCUMENTS

| | | | |
|---|---|---|---|
| 5,907,196 A | 5/1999 | Hayami et al. | |
| 6,183,118 B1 | 2/2001 | Toda et al. | |
| 6,193,398 B1 * | 2/2001 | Okuchi et al. | .............. 362/466 |
| 6,229,263 B1 | 5/2001 | Izawa | |
| 6,302,553 B1 | 10/2001 | Izawa | |
| 6,305,823 B1 | 10/2001 | Toda et al. | |
| 6,332,698 B1 | 12/2001 | Toda et al. | |

* cited by examiner

Primary Examiner—Alan Cariaso
Assistant Examiner—Mark Tsidulko
(74) Attorney, Agent, or Firm—Sughrue Mion, PLLC (57) ABSTRACT

An irradiating direction control device 1 of a lamp 7 for a vehicle carries out an operation for a vehicle attitude based on detection information obtained by vehicle height detecting means 2 and changes the irradiating direction of the lamp according to the vehicle attitude. Nonvolatile storage means 4 is caused to store data indicate of an actual vehicle height value in the reference state of the vehicle attitude or a difference between the actual vehicle height value and a vehicle height value for a vehicle design, thereby calculating the tilt of the vehicle attitude based on vehicle height data corrected by the stored data at time of irradiation control and controlling the irradiating direction of the lamp correspondingly.

4 Claims, 4 Drawing Sheets

IRRADIATING DIRECTION CONTROL DEVICE FOR VEHICLE LAMP

BACKGROUND OF THE INVENTION

1. Field of the Invention

The present invention relates to a technique for taking countermeasures against factors such as a variation in a vehicle body and attachment errors of vehicle height detecting means, thereby guaranteeing reliable irradiation control in an irradiating direction control device for a vehicle lamp which is constituted to detect a vehicle height displacement for the axle portion(s) of a front wheel and/or a rear wheel in a vehicle to obtain a change in a vehicle attitude, and to control the irradiating direction for the vehicle lamp depending on the change.

2. Description of the Related Art

There has been known a device (a so-called autoleveling device) for always correcting the irradiating direction of a lamp to cancel the influence of a change in a vehicle attitude in order to prevent the direction of the irradiated light of the lamp provided in the vehicle from being unstabilized by the change in the attitude in the direction of advance of the vehicle dulling stop or running of the vehicle.

For example, there has been proposed a device for calculating a vehicle attitude (a pitch angle) based on a detection signal measured by vehicle height detecting means provided for the axle portion of a front wheel or a rear wheel and driving the reflecting mirror of a lamp in such a direction as to offset the change, thereby automatically adjusting an optical axis.

In a general vehicle height measuring method, a vehicle height sensor for measuring a distance between an axle and a vehicle body is used. An actual vehicle has various errors (for example, the assembly error of a vehicle, the attachment error of a vehicle height sensor, and the error of the vehicle height sensor itself such as an error made by a variation in a sensor output origin). Therefore, the result of an operation of the vehicle attitude is influenced so that a pitch angle thus calculated includes an error, for example. Since the error can be absorbed by the initial adjustment of a lamp (aiming adjustment), it is not reflected as a shift from the optical axis of the lamp.

However, a method of taking countermeasures against the error factors by only the aiming adjustment is limited and has the following problems, for example.

Referring to an actuator for driving a reflecting mirror in a lamp, it is necessary to maintain a movable range taking an error into consideration. For example, the moving stroke of the actuator is great in a lamp having a long lamp span to be a distance between a rotating fulcrum (or a tilt fulcrum) in a movable reflecting mirror and an actuator fixing portion (connecting portion). Therefore, there is a drawback that a moving margin for absorbing an error cannot be sufficiently maintained or a sufficient stroke cannot be obtained due to the maintenance of the moving margin. The same drawback is caused in a vehicle having a short wheel base. More specifically, in such a vehicle, a change in a pitch angle is great. For this reason, the moving stroke of the actuator is to be increased.

The stroke of the actuator is set to be "a stroke required actually for the driving control of a reflecting mirror (a stroke for a design)+error X2" (the "X2" portion depends on the necessity for considering a stroke corresponding to the same error in the directions of protrusion and retreat of the actuator). In the case in which the stroke is set to be constant, therefore, a strain is put on a necessary stroke if a stroke for absorbing an error is excessively increased. As a matter of course, there is no problem if a total stroke including "error X2" can be always maintained. In the case in which the arrangement space of the lamp or the actuator in the vehicle is restricted, such a guarantee cannot be always obtained.

In the case in which a loading space is not mounted at time of shipping from a factory but is mounted by a mounting dealer according to uses after the shipping as in a motor truck, the attitude of a vehicle of the same type is greatly varied depending on a mounting condition. However, it is impossible to predict a change in the vehicle attitude which is caused by the mounting. Therefore, the moving margin for difference absorption cannot be set in advance. Accordingly, the countermeasures cannot be taken by the conventional method.

In the case in which the influence of various error factors cannot be eliminated sufficiently, accordingly, there is a possibility that the change in the vehicle attitude might be neither detected nor recognized accurately, resulting in a deterioration in control precision in an irradiating direction.

SUMMARY OF THE INVENTION

Therefore, it is an object of the invention to eliminate a variation in precision in attachment of vehicle height detecting means to a vehicle body and the influence on the detection of a vehicle attitude which is caused by an individual difference in the vehicle.

In order to solve the problems described above, the invention provides an irradiating direction control device for a vehicle lamp which carries out an operation for a vehicle attitude based on detection information obtained by vehicle height detecting means and changes an irradiating direction of the lamp depending on the vehicle attitude, comprising nonvolatile storage means for storing data indicative of an actual vehicle height value in a reference state of the vehicle attitude or a difference between the vehicle height value and a vehicle height value for a vehicle design, and irradiation control means for obtaining the vehicle attitude by an operation from vehicle height data corrected by using the data stored in the storage means for the detection information obtained by the vehicle height detecting means and controlling the irradiating direction of the lamp to cancel an influence of a change in the vehicle attitude based on a result of the operation.

According to the invention, therefore, the data indicative of the actual vehicle height value in the reference state of the vehicle attitude or the difference between the actual vehicle height value and the vehicle height value for a vehicle design are stored in advance, and the tilt of the vehicle attitude can be obtained based on the vehicle height data corrected by the stored data during irradiation control and the irradiating direction of the lamp can be controlled correspondingly.

DESCRIPTION OF THE PREFERRED EMBODIMENTS

Figure 1:
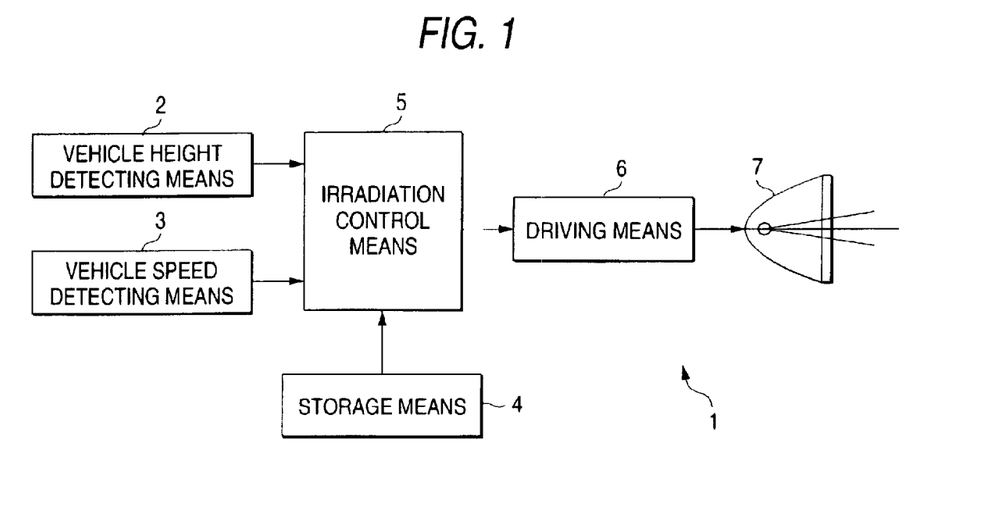
FIG. 1 is a block diagram showing the basic structure of an irradiating direction control device according to the invention.

FIG. 1 shows the basic structure of an irradiating direction control device according to the invention.

An irradiating direction control device 1 comprises vehicle height detecting means 2, vehicle speed detecting means 3, storage means 4, irradiation control means 5 and driving means 6. Examples of a lamp 7 of which irradiating direction is controlled by the irradiation control means 5 through the driving means 6 include a headlamp, a fog lamp and a cornering lamp in the case of a lamp for an automobile.

The vehicle height detecting means 2 is provided for detecting a vehicle height displacement from a space between the axle portion of a front wheel or a rear wheel in a vehicle and a vehicle body, and a detection signal is sent to the irradiation control means 5 and is utilized as basic information for obtaining the stop attitude or running attitude of the vehicle. For example, there is proposed a configuration in which a vehicle height sensor for detecting a vertical fluctuation in the axle portion of the front wheel or the rear wheel is provided.

For example, there are a configuration in which one vehicle height detecting means 2 is provided for each of the front and rear axle portions and a configuration in which only one vehicle height detecting means 2 is provided on one of the axle portions. In the latter case, it is preferable that the vehicle height detecting means should be provided in an axle portion having a large amount of a change in a vehicle height for a change in a static load (the reason is that the axle portion of the rear wheel is influenced more easily by a change in a load in a vehicle than the axle portion of the front wheel and the change can be therefore detected easily in the case in which a center of gravity of the vehicle is positioned forward, for example).

The vehicle speed detecting means 3 is provided for detecting the speed of a vehicle, and furthermore, an acceleration and an additional acceleration, and a detection signal thereof is sent to the irradiation control means 5 to provide information about a stop condition or a running condition.

The storage means 4 serves to store data indicative of an actual vehicle height value (or a vehicle height detection value) in the reference state of a vehicle attitude or a difference between the actual vehicle height value and a vehicle height value for a vehicle design, and nonvolatile storage means is used.

The "reference state of a vehicle attitude" implies a state in which the reference attitude of a vehicle body is set for the detection of a vehicle height, and includes a state in which the aiming adjustment of a headlamp is carried out (one occupant or an empty vehicle state) in the manufacturing line of an automobile manufacturer or the repair of an automobile, for example, which is preferable because an initial adjustment related to the optical axis of the headlamp is carried out (leveling control can be performed on the basis of an aiming adjusted state).

Examples of the storage means 4 include a flash memory and an EEPROM (Electrical Erasable and Programmable Read Only Memory) in which electrical write and erase can be carried out and data are not erased but retained when a power supply is turned off, or an RAM (Random Access Memory) in which backup is executed by a capacitor or a battery such that data are not erased when a power supply is turned off.

As the irradiation control means 5, an ECU (electronic control unit) including a microcomputer is used for an automobile, for example, and the irradiation control means 5 has a configuration in which a built-in memory is utilized as the storage means 4 and a configuration in which an exterior memory is used as the storage means 4.

For detection information obtained by the vehicle height detecting means 2, the irradiation control means 5 corrects vehicle height data by using the data stored in the storage means 4. A vehicle attitude is calculated from the corrected vehicle height data by an operation and a control signal for canceling the influence of a change in the vehicle attitude is sent to the driving means 6 based on the result of the operation.

Examples of the driving means 6 include a structure in which a stepping motor and a driving circuit thereof are used, and any mechanism using an actuator such as a DC motor or a solenoid may be employed. Moreover, a well-known mechanism can be used for the irradiation control mechanism (the leveling mechanism) of a lamp (for example, an actuator is provided on the back of a lamp body and the tilt attitude of a reflecting mirror in a lamp housing is changed to control the irradiating direction of a lamp). The leveling control according to the invention can be applied irrespective of static or dynamic control.

Next, description will be given to a processing of correcting vehicle height data in the irradiation control means 5.

First of all, an embodiment in which one vehicle height detecting means is attached to each of the axels of front and rear wheels will be taken as an example. In the case in which all error factors are neglected (or in the ideal case in which no error is made), it is easy to calculate the tilt angle (pitch angle) of a vehicle attitude from each of vehicle height detection values detected by the vehicle height detecting means at time of a change in the load of a vehicle and the wheel base of the vehicle.

However, the error factors are to be actually taken into consideration.

The data to be retained in the storage means 4 have the following configurations.

(I) A configuration in which an actual vehicle height value in the reference state of a vehicle attitude is stored; and (II) A configuration in which the actual vehicle height value in the reference state of the vehicle attitude and a vehicle height value for a vehicle design.

First of all, the configuration (1) will be described. Data (indicated as "Hf0") on an actual vehicle height value for the axle portion of a front wheel in the reference state of the vehicle attitude and data (indicated as "Hr0") on an actual vehicle height value for the axle portion of a rear wheel are stored in the nonvolatile storage means 4.

When vehicle height detection data detected according to a change in the load of a vehicle by the vehicle height detecting means provided for the axle portion of the front wheel are indicated as "Hf" ("f" implies "front"), and vehicle height detection data detected according to a change in the load of the vehicle by the vehicle height detecting means provided for the axle portion of a rear wheel are indicated as "Hr" ("r" implies "rear"), the procedure for calculating a tilt angle "p" (a pitch angle) of the vehicle attitude is as follows, for example.

(1) The data "Hf0" and Hr0" are subtracted from the data "Hf" and "Hr" to calculate "Hf−Hf0" and "Hr−Hr0", respectively;
(2) A difference between "Hf−Hf0" and "Hr−Hr0" is taken and is divided by a wheel base "W" of the vehicle; and
(3) An inverse tangential function value is calculated from the value of (2) and represents the tilt angle "p" of the vehicle attitude.

In other words, it is preferable that a calculation should be carried out by using "p=arc tan(((Hf−Hf0)−(Hr−Hr0))/W)". "arc tan (X)" represents an inverse tangential function (an inverse function of tan) of a variable X.

In the equation described above, Hf0 and Hr0 represent a vehicle height value in the reference state which is stored as an initial value, and reflect an individual difference in a vehicle, the error of vehicle height detecting means itself and the attachment error of the means to a vehicle body and are varied for each vehicle. Hf=Hf0 and Hr=Hr0 have no tilt and an aiming adjustment is carried out such that the optical axis of a lamp in the reference state is turned in a specified direction, for example.

In the case of the configuration (II), next, the storage means 4 is caused to store difference data "ΔHf(=Hf0'−Hf0)" and "ΔHr(=Hr0'−Hr0)" indicative of a difference between the actual vehicle height values "Hf0" and "Hr0" and vehicle height values "Hf0'" and "Hr0'" for a vehicle design.

The following procedure is carried out in order to calculate the tilt angle "p" of the vehicle attitude.

(1) Differences between "Hf0'", "Hr0'" and "ΔHf", "ΔHr" are subtracted from the data "Hf" and "Hr" respectively to obtain "Hf−(Hf0'−ΔHf)" and "Hr−(Hr0'−ΔHr)";
(2) A difference of "Hf−(Hf0'−ΔHf)"−[Hr−(Hr0'−ΔHr)]" is divided by a wheel base "W"; and
(3) An inverse tangential function value is calculated from the value of (2) and represents the tilt angle "p" of the vehicle attitude.

In other words, it is preferable that a calculation should be carried out by using "p=arc tan((Hf−(Hf0'·ΔHf)−[Hr−(Hr0'·ΔHr)])/W)".

Since Hf0' and Hr0' represent a design value, they are unchanged as long as the type of a vehicle is identical. Accordingly, ΔHf and ΔHr indicative of a difference between an actual value and a design value reflect the individual difference in the vehicle, the error of the vehicle height detecting means itself and the attachment error of the means to the vehicle body.

If "ΔHf=Hf0'−Hf0" and "ΔHr=Hr0'−Hr0" are substituted for the equation, the same contents as those in the equation described above for the configuration (I) can be obtained as is easily apparent.

The configurations (I) and (II) are different from each other in that Hf0 and Hr0 to be vehicle height measured values are exactly stored in the configuration (I), while ΔHf and ΔHr to be differences between the actual values and the design values are stored in the configuration (II). For example, in the configuration (I), the measured value in the reference state is exactly stored and can be known immediately. However, in the case in which the stored data are lost for some reason (there is no backup of data), there is no clue for recovering the value. On the other hand, in the configuration (II), in the case in which it is apparent that statistical data on ΔHf and ΔHr are left and are set within a certain range, for example, data can be rewritten using an estimated value (In most of vehicles, for example, it is preferable that an intermediate value should be used for an estimated value within a range of "α≦|ΔHf|≦β". As a result, it is a matter of course that the data are not coincident with original stored data and it is possible to expect a value which is not greatly different.) In the configuration (II), moreover, Hf0' and Hr0' can be described in a program. Even if ΔHf and ΔHr become zero due to data erasure, Hf0' and Hr0' remain in the equation.

While the configuration in which the vehicle height detecting means is provided in each of the front and rear axle portions of the vehicle has been described above, description will be given to such a configuration that the vehicle height detecting means is provided in only one of the axle portions.

In the configuration, in the case in which the error factor is disregarded, a change in a height related to one of the axle portions and a change related to the other axle portion have a constant correlation. In other words, it is possible to know a vehicle attitude in response to one vehicle height detection signal by using a control line obtained from a vehicle design value (for example, a control line in accordance with an equation for estimating a front vehicle height from a rear vehicle height).

For this reason, a control line indicative of the correlation of the tilt angle of the vehicle attitude to a vehicle height displacement detected by the vehicle height detecting means provided for the axle portion of a front wheel or a rear wheel is prepared in the irradiation control means 5. As a simple example, the vehicle height value of "H" and the tilt angle "p" of the vehicle attitude have a linear function relationship of "p=A·H+B" (A and B represent a constant). In other words, in the case in which the error factor is disregarded, a detection value for H is substituted for the equation so that the tilt angle p can be obtained.

However, the error factor is to be actually taken into consideration.

Referring to the axle portion in the reference state of the vehicle attitude, first of all, the storage means 4 is caused to store an actual vehicle height value "H0" or difference data "ΔH (=H0'−H0)" indicative of a difference between the actual vehicle height value "H0" and a vehicle height value "H0'" for a vehicle design.

Preferably, "H−(H0'−H0)" obtained by subtracting "H0'−H0" from "H" representing vehicle height detection data detected by the vehicle height detecting means at time of a change in the load of the vehicle or "H−ΔH" is calculated as a vehicle height value (which is set to be new "H") and is substituted for the expression of a control line (that is, substitution for H of "p=A·H+B" in this example), thereby acquiring the tilt angle "p" of the vehicle attitude. If "H0'=H0" (ΔH=0) is set, an exact design can be obtained. If not so, "H0'−H0" has a value and therefore reflects an error. In the case in which the vehicle height measured value of "H0" is to be stored in the storage means 4, the value "H0'" for a design does not need to be stored in a nonvolatile memory (and, for example, can be described in a program) and the difference data "ΔH" are to be stored in the storage means 4.

In the above description, in the case in which the tilt angle p of the vehicle attitude is to be calculated from the detection value obtained by only the vehicle height detecting means provided in the rear axle, for example, it is preferable that "H" should be replaced with "Hr" and a rear vehicle height value should be calculated based on "Hr−(Hr0'−Hr0)" and be substituted for the expression of a control line.

Moreover, one control line is not always limited but a plurality of control lines can be used separately according to a load distribution. For example, in the case in which there is provided load distribution state detecting means for detecting a change in the load distribution of a vehicle with a change in an occupant or a load in the vehicle, it is preferable that the load distribution should be detected separately for a change in a human load and a change in a physical load in respect of the efficiency of a processing.

(a) A change in a load depending on the number and arrangement of occupants; and (b) A change in a load depending on the weight and arrangement of loaded things.

Referring to the (a), first of all, the change in a load is caused by a change in the position and weight of occupants in the vehicle. For example, it is possible to directly obtain the change in a load by detecting that a person is taking a seat or not or by detecting the weight of a person taking a seat by means of a seating sensor or a weight detecting sensor which is provided in the seat. In addition, it is possible to indirectly calculate a load by detecting that a person is taking a seat or not by means of a non-contact sensor utilizing light (infrared rays) or an acoustic wave or detecting the presence of seat belt fastening by means of a sensor (including a mechanical switch) and by estimating a mean value for the weight of a person (for example, using a weight value which is predetermined according to the result of a decision as to whether a person is an adult or a child depending on the sitting height of the person taking a seat). Alternatively, in the case in which a seating position is determined as in an automobile, it is possible to decide whether or not a person is taking a passenger seat based on a door opening/closing signal and an opening/closing time interval.

Referring to the (b), moreover, it is preferable that a sensor for detecting the position and weight of a loaded thing should be provided in a vehicle, for example. In other words, it is possible to directly detect a change in a load by detecting the presence and amount of a load applied to a trunk room or a loading space in the vehicle. In that case, the weight of the loaded thing can also be detected as a continuous amount. It is preferable that the range should be divided stepwise in order to simplify the structure of a device.

In any case, a plurality of control lines corresponding to a load distribution state are prepared and any of the control lines corresponding to a current load distribution state is selected in irradiation control. Preferably, the tilt angle of a vehicle attitude is calculated from the detection signal of the vehicle height detecting means based on the control line and the direction of the irradiating optical axis of a lamp is controlled in such a direction as to cancel the influence.

Figure 2:
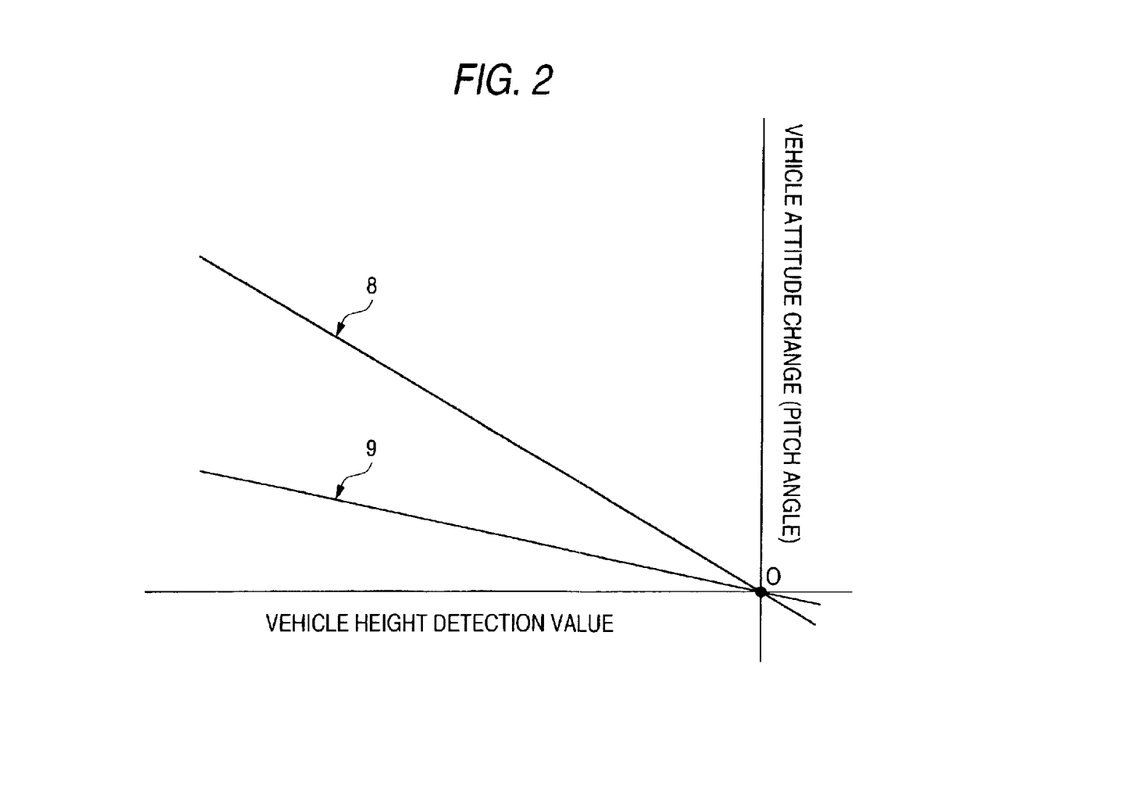
FIG. 2 is a graph showing an example of the relationship between a vehicle height detection value and a change in a vehicle attitude.

FIG. 2 illustrates two control lines 8 and 9, in which an axis of abscissa indicates a vehicle height detection value (the output of a vehicle height sensor provided in a rear axle) and an axis of ordinate indicates a tilt angle (a pitch angle) representing a vehicle attitude (a stop attitude or an attitude in stable running such as constant speed running). A point "O" positioned on an origin indicates a situation in which one driver takes a vehicle (an automobile), and is set to an origin position by carrying out an aiming adjustment during shipping over the irradiating optical axis of a lamp.

Both of the control lines 8 and 9 are defined by a linear expression through linear approximation (for example, a straight line represented as a linear regression expression for a plurality of points). Accordingly, in the case in which each control line is specified as a straight line passing through an origin as shown, a proportional relationship related to both axes can be recognized (the tilt of the control line 8 is greater than that of the control line 9 in the drawing).

In order to properly use these two control lines, preferably, a seating sensor for detecting that a person is taking a passenger seat or not is provided as load distribution state detecting means to select the control line 8 if it is not detected that a person is taking the passenger seat and to select the control line 9 if it is detected that a person is taking the passenger seat.

In addition, examples of correction in the irradiating direction of a lamp for a change in the running attitude of a vehicle include the following configurations, for example.

(I) A configuration in which the number or weight of occupants in front seats is detected to change the tilt or intercept of the control line depending on a loading state at that time;

(II) A configuration in which the weights of occupants in a driver seat and a passenger seat are detected separately and a loading state is classified into a plurality of stages, thereby switching the control line depending on the loading state in each stage;

(III) A configuration in which the total weight of occupants in the front seats is detected and the loading state is classified into a plurality of stages, thereby switching the control line depending on the loading state in each stage; and (IV) A configuration in which the presence or amount of a load applied to a trunk room or a loading space in a vehicle is detected and the tilt or intercept of the control line is changed depending on a load distribution state at that time.

In addition, it is possible to carry out various configurations in which a reference vehicle height value (data in the storage means 4) is changed depending on the load distribution state, thereby calculating the tilt angle of a vehicle attitude from the correction value of vehicle height data based on the reference vehicle height value.

In the case in which mounting is to be carried out according to uses by a mounting dealer after shipping as in a motor truck, the vehicle attitude is greatly varied depending on a mounting state. Therefore, a reference attitude is predetermined and a vehicle height value measured at that time or difference data based on the vehicle height value are stored so that a new control reference (a reference vehicle height value) can be set. Consequently, it is possible to correctly control (or adjust) the irradiating direction of a lamp later.

EXAMPLE

Figure 3:
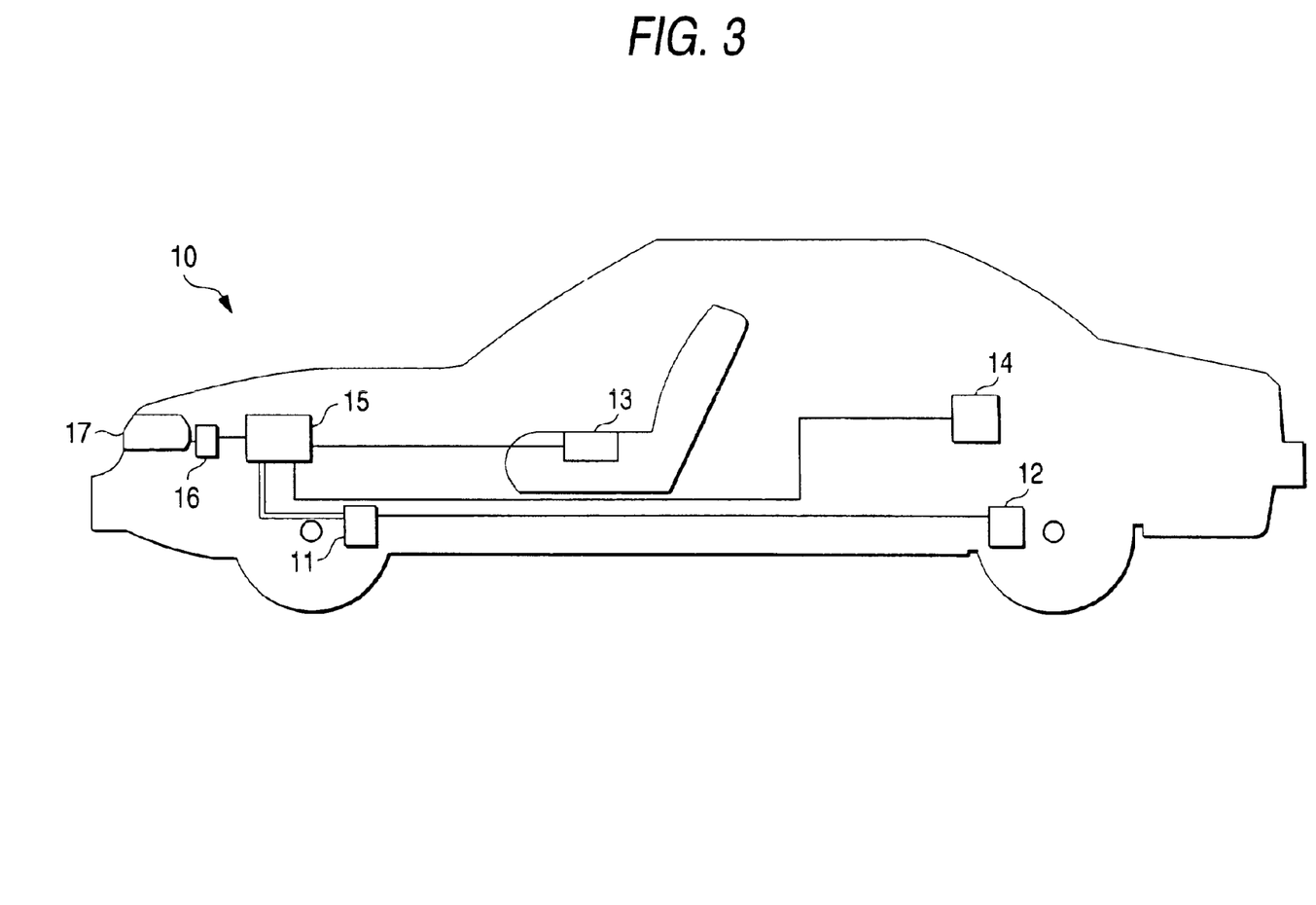
FIG. 3 is a block diagram schematically showing the structure of the device according to an embodiment of the invention together with FIGS. 4 and 5.
Figure 4:
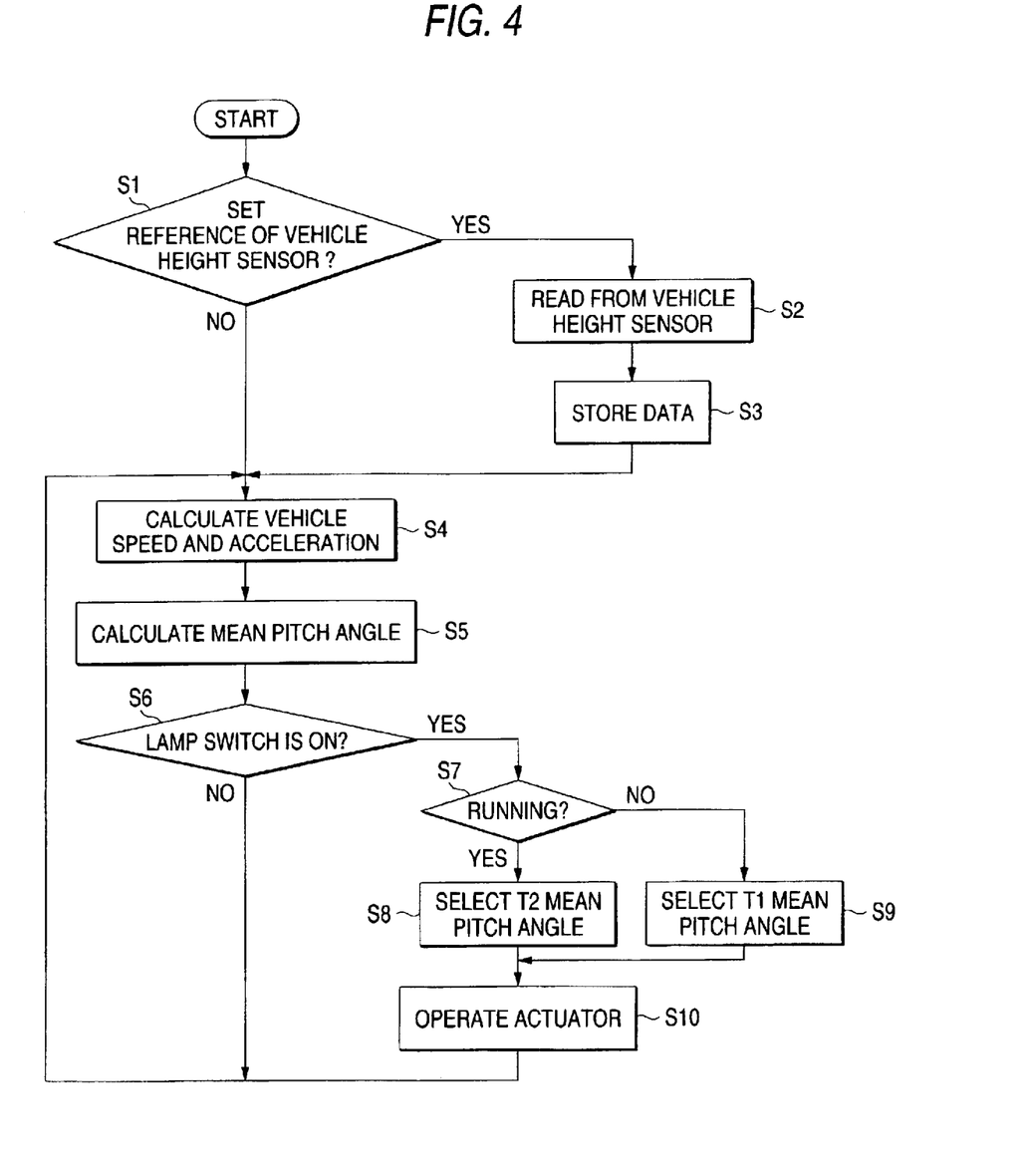
FIG. 4 is a flow chart showing an example of a processing procedure.
Figure 5:
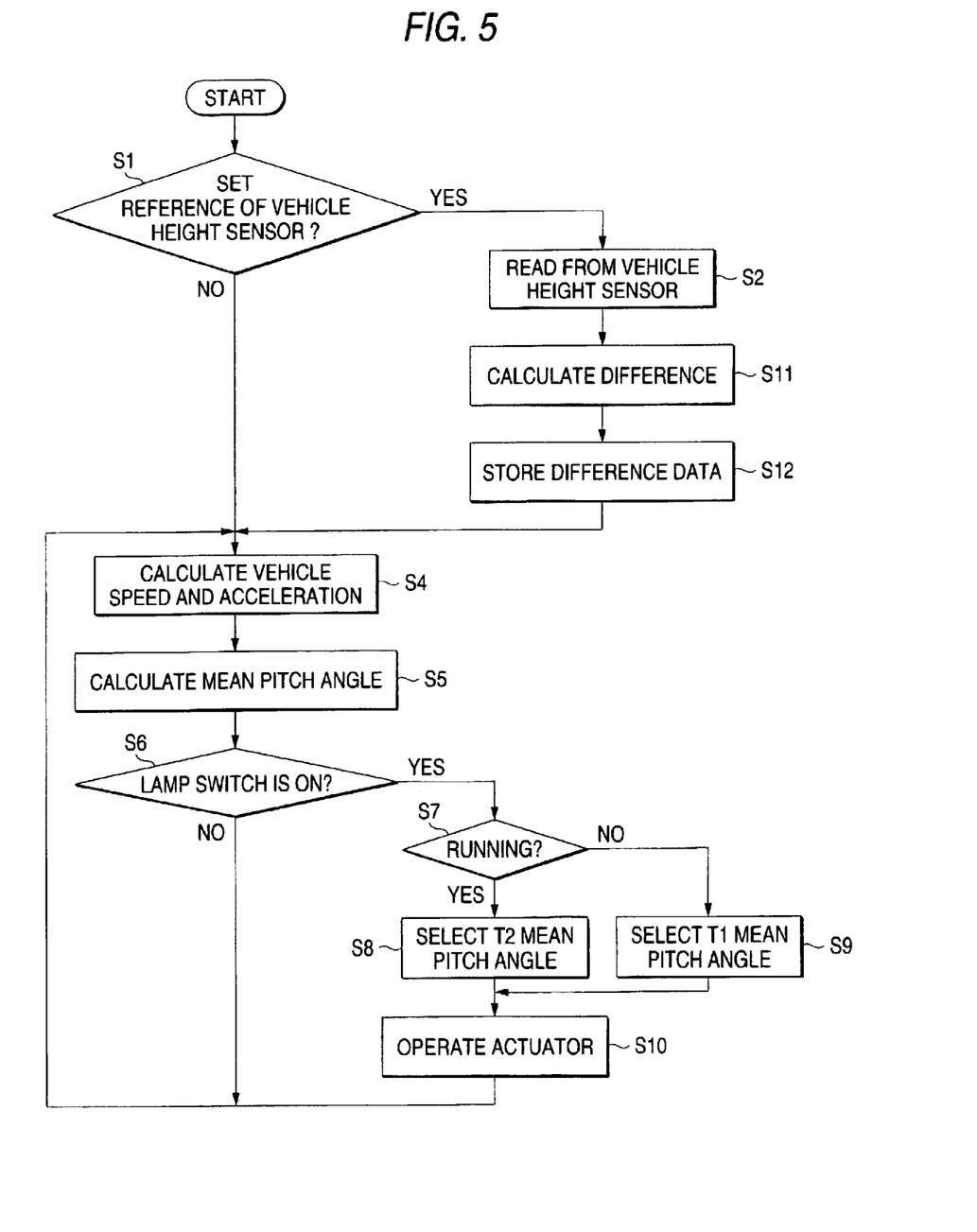
FIG. 5 is a flow chart showing another example of the processing procedure.

FIGS. 3 to 5 show an example in which the invention is applied to an irradiation control device of a lamp for an automobile.

FIG. 3 shows an example 10 of a device structure comprising the following elements (the numerals in parentheses denote designations).

Front vehicle height sensor (11)

Rear vehicle height sensor (12)

Seating sensor (13) of passenger seat

Vehicle speed sensor (14)

ECU (15)

Actuator (16)

Headlamp (17).

The ECU 15 is an electronic control unit for carrying out an operation by using a built-in microcomputer. The ECU 15 includes a nonvolatile memory constituting the storage means 4. Moreover, left and right headlamps and actuators for leveling thereof are provided in the front part of a vehicle. For simplicity of the description and no difference in leveling control between both of the headlamps, only one of the headlamps will be described below.

The vehicle height sensors 11 and 12 send detection signals thereof to the ECU 15.

Moreover, the seating sensor 13 is provided for detecting that a person is taking a passenger seat or not and sends an output signal thereof to the ECU 15. For example, it is possible to detect the presence of a weight of 15 kg or more in the passenger seat.

For example, a sensor provided in a rear wheel for an ABS (Anti-skid Brake System) can be used for the vehicle speed sensor 14, and the detection signal of the sensor is sent from an ABS control unit to the ECU 15.

Referring to a vehicle attitude calculating process, a calculation is carried out by the equation described above based on the vehicle height detection values sent from the vehicle height sensors 11 and 12 in the ECU 15. In that case, the correcting process described above is carried out based on the data stored in the nonvolatile memory. In the case in which one of the vehicle height sensors is used to carry out irradiation control (for example, when the vehicle height sensor has a failure), a pitch angle is calculated in accordance with a predetermined control line. In other words, the control line is described as an expression (for example, a linear function expression) by a program in the ECU or has already been stored in the memory. When a detection signal is sent from the seating sensor 13 to the ECU 15, the load distribution state of a vehicle can be grasped depending on the presence of seating in response to the detection signal so that a reference vehicle height value can be corrected depending on the state or a control line to be used is specified.

The ECU 15 calculates the amount of control for driving a leveling mechanism from the result of the calculation of a vehicle attitude and sends the amount of control to the actuator 16. Since a signal is sent from the vehicle speed sensor 14 to the ECU 15, the ECU 15 can know whether a vehicle is stopping or running. For example, therefore, it is possible to carry out control such that the leveling control is performed during stopping or stable running or the leveling control is prohibited in other situations (for example, on a concavo convex rough road). Examples of a method of deciding whether or not the vehicle is "stably running" include various configurations, for example, a method of acquiring an acceleration when a vehicle is running (it is preferable to calculate a first order differential based on a time for a vehicle speed value) and deciding that the vehicle is stably running when the acceleration and the vehicle speed are set within a tolerance or a time taken for the continuation of this state is recognized over a predetermined reference time or more, and a method of obtaining an additional acceleration from an acceleration and making a decision based on the additional acceleration, and further description will be therefore omitted.

The actuator 16 operates the leveling mechanism in response to the signal sent from the ECU 15. Consequently, it is possible to carry out control such that the irradiating optical axis of the headlamp 17 is turned in a constant direction in respect of a change in the vehicle attitude.

FIGS. 4 and 5 are flow charts for explaining the operation of the device.

FIG. 4 shows an example of a processing to be carried out in the case in which the configuration (I) is employed. At a step S1, first of all, it is decided whether or not reference setting is carried out for the vehicle height sensors 11 and 12. If the reference setting is carried out, the processing proceeds to a step S2. If the reference setting is not carried out, the processing proceeds to a step S4.

At the step S2, the detection values (Hf0, Hr0) of the vehicle height sensor in the reference state of a vehicle attitude, for example, in such a state as to carry out an aiming adjustment are read and the processing proceeds to a step S3 in which the detection values are stored in the nonvolatile memory of the ECU 15, and thereafter, the processing proceeds to the step S4. Examples of the storage of a reference vehicle height value include a configuration in which an initializing switch provided in the ECU is operated, thereby causing a microcomputer to recognize that the reference state of the vehicle attitude is set and storing the vehicle height detection value in the nonvolatile memory at that time, and a configuration in which an initializing signal is input to the connector terminal of the ECU, thereby causing the microcomputer to recognize that the reference state of the vehicle attitude is set and storing a vehicle height detection value in the nonvolatile memory at that time.

At the step S4, a vehicle speed and an acceleration are calculated based on the detection signal sent from the vehicle speed sensor 14.

At a step S5, next, the pitch angle of a vehicle is calculated by an operation based on the detection values of the vehicle height sensors 11 and 12 and the data stored at the step S3. Then, a mean value in a predetermined time for the pitch angle (for example, a mean pitch angle for T1 seconds or a mean pitch angle for T2 (>T1) seconds) is calculated. In the calculation of the pitch angle, reference is made to the presence of seating in a passenger seat based on the detection signal sent from the seating sensor 13.

At a step S6, subsequently, it is decided whether or not a headlamp switch is turned ON. If the headlamp switch is ON, the processing proceeds to a step S7. If the headlamp switch is OFF, the processing returns to the step S4.

At the step S7, the running state of the vehicle is decided based on a signal output from the vehicle speed sensor 14. If it is decided that the vehicle is running, the processing proceeds to a step S8. If it is decided that the vehicle is stopping, the processing proceeds to a step S9.

At the step S8, the mean pitch angle obtained at the step S5, for example, the mean pitch angle for T2 seconds is selected to calculate the amount of control for leveling control corresponding thereto and to send a control signal to the actuator 16, and thereafter, the processing proceeds to a step S10.

At the step S9, moreover, the pitch angle obtained at the step S5, for example, the mean pitch angle for T1(<T2) seconds is selected to calculate the amount of control for leveling control corresponding thereto and to send a control signal to the actuator 16, and thereafter, the processing proceeds to the step S10.

At the step S10, the leveling mechanism is operated by the driving operation of the actuator 16, thereby controlling the irradiating direction of the headlamp 17. Then, the processing returns to the step S4.

At the step S8, it is possible to carry out detailed control corresponding to the sections of the vehicle speed and the acceleration which are calculated at the step S4 (for example, the leveling control is temporarily prohibited or a constant waiting time is provided in order to prevent overcorrection from being caused by excessively carrying out irradiating optical axis control at time of rapid acceleration or deceleration and to prevent dazzling light from being given to a vehicle running in the opposite direction or a road user), and there are various manners and specific description will be therefore omitted.

FIG. 5 shows an example of a processing to be carried out in the case in which the configuration (II) is employed, and only a difference from FIG. 4 will be described below.

At a step S1, first of all, if it is decided that reference setting is to be carried out for the vehicle height sensors 11 and 12, the processing proceeds to a step S2 in which the detection values (Hf0, Hr0) of the vehicle height sensor in the reference state of a vehicle attitude (for example, a state in which an aiming adjustment is to be carried out) are read and the processing then proceeds to a step S11.

At the step S11, difference data (ΔHf=Hf0'−Hf0, ΔHr=Hr0'−Hr0) between the vehicle height value (Hf0', Hr0') for a vehicle design and the vehicle height value in the previous step are calculated.

At a step S12, next, the difference data obtained at the previous step are stored in the nonvolatile memory of the ECU 15, and thereafter, the processing proceeds to a step S4.

The steps S4 to S10 are basically the same as those in FIG. 4. At a step S5, however, a pitch angle is calculated based on the difference data and vehicle height data to be corrected by using the vehicle height value for a vehicle design.

As described above, the detection value of the vehicle height sensor at time of aiming is stored by using an electrical writable and erasable nonvolatile memory and a change in the vehicle attitude is calculated by an operation based on the detection value so that the optical axis of a lamp can be adjusted and control can be carried out. Therefore, it is possible to eliminate the influence of the error factor. Referring to the stroke of an actuator, it is not necessary to previously estimate and set an error absorption.

As is apparent from the above description, according to the first aspect of the invention, data indicative of the actual vehicle height value in the reference state of the vehicle attitude or the difference between the actual vehicle height value and the vehicle height value for a vehicle design are stored in advance, and the tilt of the vehicle attitude is obtained based on the vehicle height data corrected by the stored data during irradiation control and the irradiating direction of the lamp is controlled correspondingly. Consequently, the influence of various error factors can be eliminated. Differently from a countermeasure taken by only the aiming adjustment, therefore, the actuator does not suffer from a problem related to the setting of a stroke for error absorption. Moreover, a change in the attitude of the vehicle can be detected and recognized correctly so that control precision in the irradiating direction can be enhanced.

According to the second aspect of the invention, the actual vehicle height value in the reference state of the vehicle attitude can be stored exactly and the vehicle height data can be corrected by using the actual vehicle height value.

According to the third aspect of the invention, the difference data indicative of the difference between the actual vehicle height value in the reference state of the vehicle attitude and the vehicle height value for a vehicle design can be stored and the vehicle height data can be corrected by using the difference data. Consequently, only the difference data are gone during data erasure, and furthermore, a countermeasure can easily be taken by rewriting.

According to the fourth aspect of the invention, the tilt angle of the vehicle attitude can be calculated by using only the vehicle height detecting means provided in one of the axle portions. Therefore, the structure and processing can be simplified. In other words, it is not necessary to provide the vehicle height detecting means in the axle portions of the front and rear wheels in the vehicle, respectively. Consequently, the number of components can be decreased so that a cost can be reduced and a time required for working can be shortened. Moreover, even if the vehicle height detecting means is provided in each of the axle portions of the front and rear wheels in the vehicle, support can be carried out by calculating the vehicle attitude based on the detection signal of one of the vehicle height detecting means and by performing control in the irradiating direction of the lamp corresponding thereto when the other vehicle height detecting means does not function due to a failure. Consequently, the reliability of the device can be enhanced.

According to the fifth aspect of the invention, the reference state of the vehicle speed is specified into such a condition that the aiming of the headlamp is to be carried out. Based on such a condition, consequently, the leveling control can be carried out over the lamp subjected to the aiming adjustment. Thus, controllability and precision can be enhanced.

What is claimed is:

1. An irradiating direction control device for a vehicle lamp which carries out an operation for a vehicle attitude based on detection information obtained by vehicle height detecting means and changes an irradiating direction of the lamp depending on the vehicle attitude, comprising:

nonvolatile storage means for storing data indicative of an actual vehicle height value in a reference state of the vehicle attitude or a difference between the vehicle height value and a vehicle height value for a vehicle design; and irradiation control means for obtaining the vehicle attitude by an operation from vehicle height data corrected by using the data stored in the storage means for the detection information obtained by the vehicle height detecting means and controlling the irradiating direction of the lamp to cancel an influence of a change in the vehicle attitude based on a result of the operation, wherein difference data "ΔHf (=Hf0'−Hf0)" and "ΔHr (=Hr0'−Hr0)" indicative of differences between "Hf0" and "Hr0" indicative of actual vehicle height values for axle portions of a front wheel and a rear wheel in the vehicle in the reference state of the vehicle attitude and vehicle height values "Hf0'" and "Hr0'" for a vehicle design are stored in the non-volatile storage means respectively, and when vehicle height detection data detected depending on a change in a load of the vehicle by the vehicle height detecting means provided in the axle portions of the front wheel and the rear wheel are set to be "Hf" and "Hr" respectively, the irradiation control means obtains data "Hf−(Hf0'−ΔHf)" and "Hr −(Hr'−ΔHr)" by subtracting differences between the data "Hf0'", "Hr0'" and "ΔHf", "ΔHr" from the vehicle height detection data respectively and calculates a ratio of their differences to a wheel base "W" of the vehicle, thereby acquiring a tilt angle of the vehicle attitude as an inverse tangential function value.

2. The irradiating direction control device for a vehicle lamp which carries out an operation for a vehicle attitude based on detection information obtained by vehicle height detecting means and changes an irradiating direction of the lamp depending on the vehicle attitude, comprising:

nonvolatile storage means for storing data indicative of an actual vehicle height value in a reference state of the vehicle attitude or a difference between the vehicle height value and a vehicle height value for a vehicle design; and irradiation control means for obtaining the vehicle attitude by an operation from vehicle height data corrected by using the data stored in the storage means for the detection information obtained by the vehicle height detecting means and controlling the irradiating direction of the lamp to cancel an influence of a change in the vehicle attitude based on a result of the operation, wherein the irradiation control means prepares a control line indicative of a correlation between the detection information obtained by the vehicle height detecting means provided for an axle portion of a front wheel or a rear wheel and a tilt angle of the vehicle attitude, the nonvolatile storage means stores an actual vehicle height value "H0" for the axle portion in the reference state of the vehicle attitude or difference data "ΔH (=H0'−H0)" indicative of a difference between the actual vehicle height value "H0" and a vehicle height value "H0'" for a vehicle design, and when vehicle height detection data detected by the vehicle height detecting means depending on a change in a load of the vehicle is set to be "H", the irradiation control means calculates a tilt angle of the vehicle attitude by obtaining a vehicle height value as "H−(H0'−H0)" to be substituted for an expression of the control line.

3. The irradiating direction control device for a vehicle lamp according to claim 1, wherein the reference state of the vehicle attitude is set to be such a condition that an aiming adjustment of a headlamp is carried out.

4. The irradiating direction control device for a vehicle lamp according to claim 2, wherein the reference state of the vehicle attitude is set to be such a condition that an aiming adjustment of a headlamp is carried out.

* * * * *